United States Patent [19]

Takeshita et al.

[11] Patent Number: 5,179,451
[45] Date of Patent: Jan. 12, 1993

[54] METHOD AND DEVICE FOR SIGNAL REPRODUCTION USED IN A DIGITAL SIGNAL REPRODUCTION APPARATUS

[75] Inventors: Kazuyuki Takeshita, Hachioji; Kenji Nakano, Katsuta, both of Japan

[73] Assignee: Hitachi, Ltd., Tokyo, Japan

[21] Appl. No.: 596,386

[22] Filed: Oct. 12, 1990

[30] Foreign Application Priority Data

Oct. 18, 1989 [JP] Japan ................ 1-268905

[51] Int. Cl.⁵ .............................................. H04N 5/76
[52] U.S. Cl. ..................................... 358/335; 360/32; 358/312
[58] Field of Search ............... 358/335, 310, 342, 312, 358/337, 339; 360/10.1, 10.3, 32, 22, 33.1, 36.1, 36.2, 61, 71, 84

[56] References Cited

U.S. PATENT DOCUMENTS

| | | | |
|---|---|---|---|
| 4,376,290 | 3/1983 | Shirota | 358/314 |
| 4,392,162 | 7/1983 | Yamamoto | 360/22 |
| 4,429,334 | 1/1984 | Hashimoto et al. | 358/310 |
| 4,437,125 | 3/1984 | Yamamoto | 360/10.1 |
| 4,558,376 | 12/1985 | Heitmann | 360/10.1 |
| 4,614,979 | 9/1986 | Sugiyama et al. | 360/10.1 |
| 4,803,567 | 2/1989 | Wilkinson et al. | 360/10.1 |
| 4,907,181 | 3/1990 | Hedtke et al. | 360/32 |
| 4,914,527 | 4/1990 | Asai et al. | 360/32 |
| 5,051,848 | 9/1991 | Ishii et al. | 360/32 |
| 5,060,077 | 10/1991 | Koya et al. | 358/335 |

FOREIGN PATENT DOCUMENTS 0240364 10/1987 European Pat. Off. .

Primary Examiner—Jeffery A. Brier
Assistant Examiner—Thai Tran
Attorney, Agent, or Firm—Antonelli, Terry Stout & Kraus

[57] ABSTRACT

A signal reproduction and method therefore device for a digital signal reproduction apparatus, which reproduces digital signals recorded on a recording medium with a reproduction head. The device includes a first memory circuit which sequentially stores digital signals reproduced by the reproduction head, a circuit which identifies the attribute of a reproduced digital signal and a write control circuit which judges, based on the result of the identification provided by the identification circuit, whether digital signals of a prescribed unit length included among digital signals stored in the first memory have the same attribute, and produces a write signal in response to the judgment. Also provided is a second memory which is connected to the first memory and stores the digital signals which have the prescribed length and are judged to have the same attribute in response to the write signal.

23 Claims, 7 Drawing Sheets

FIG. 5
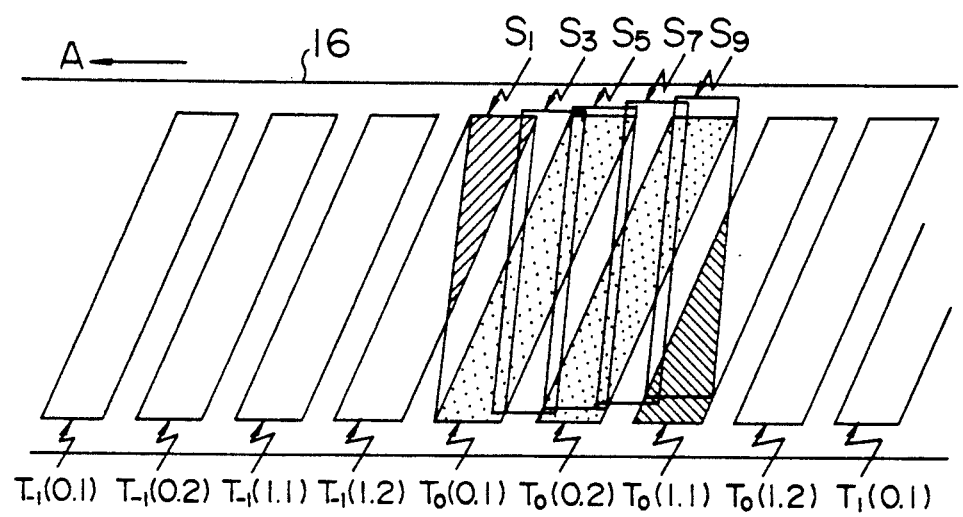
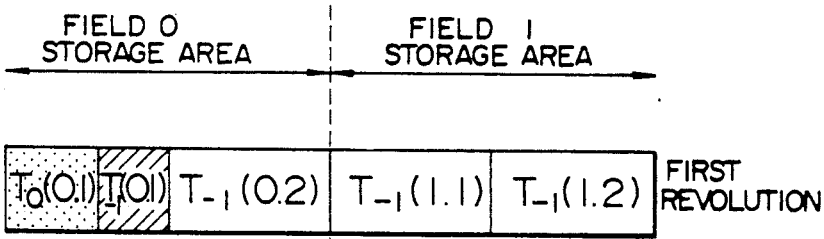
FIG. 6A
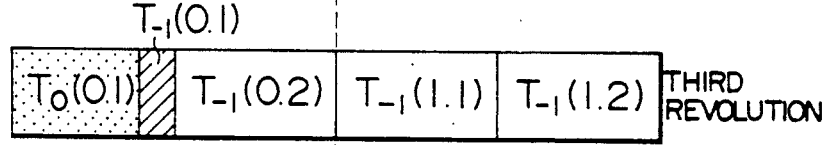
FIG. 6B
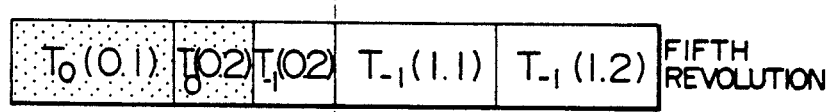
FIG. 6C
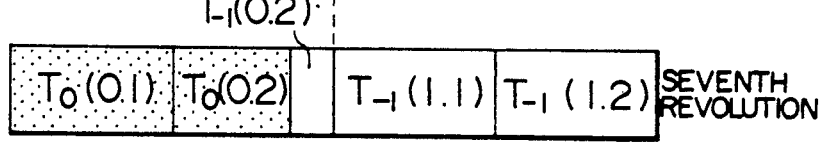
FIG. 6D
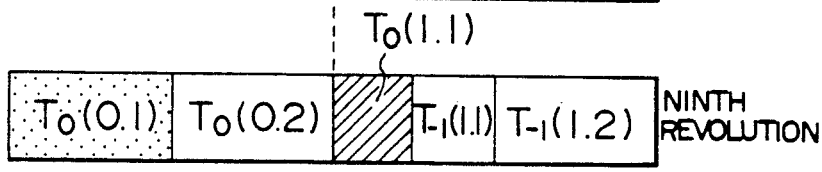
FIG. 6E

METHOD AND DEVICE FOR SIGNAL REPRODUCTION USED IN A DIGITAL SIGNAL REPRODUCTION APPARATUS

BACKGROUND OF THE INVENTION

The present invention relates to a method and device for digital signal reproduction, and particularly to a signal reproduction method and device for a digital video signal reproduction apparatus (will be termed simply "digital VTR" (Video Tape Recorder) hereinafter) having a slow-motion playback performance based on a memory.

A conventional digital VTR is disclosed in U.S. Pat. No. 4,392,162 for example. The above-mentioned digital VTR operates to record a video signal on a magnetic tape so that each field of signal is divided into a plurality of tracks. In the slow-motion playback operation for a magnetic tape on which the video signal is recorded, a memory with a capacity of one field or one frame is used to record the video signal which is retrieved from the magnetic tape at a lower tape speed, and then the stored video signal is read out of the memory. Storing of the reproduced video signal into the memory in the slow-motion playback mode is carried out in the following manner. A video signal is made up of segments of a unit time length, such as the horizontal period (will be termed "blocks" hereinafter), and each block has an appendage of an index (will be termed simply "ID" hereinafter) signal which indicates the field number and frame number to which the block belongs. The reproduced video signal is rendered the block-wise error detection and error correction process or the like, and blocks which are rid of error are stored in address locations corresponding to the ID signals in the memory. Based on the storage of reproduced video signals without error in the memory, a slow-motion picture produced by the video signals read out of the memory is flawless or errorless.

Next, the quarter-speed slow-motion playback operation of a digital VTR having a frame memory for storing the video signal for one frame will be explained in detail with reference to FIG. 5 and FIGS. 6A to 6E. The example shown here is designed such that the video signal is recorded on a magnetic tape, with each field being divided on two tracks. Accordingly, each track records the video signal for a half field length. This recording scheme is called "two segment recording", in which each field has a recording period which is equal to the time length when the magnetic head drum turns twice.

FIG. 5 shows the scanning trace of the playback head during the quarter tape speed (relative to the normal playback tape speed) slow-motion playback operation superimposed on the track pattern on the magnetic tape 16 used by the digital VTR.

In the figure, a frame of video signal in attention is called "present frame" and given a subscript of 0, the frame which precedes the frame 0 is called "front frame" and given a subscript of $-1$, and the frame which follows the frame 0 is called "rear frame" and given a subscript of 1. One frame consists of two fields, with the leading field being field 0 and latter field being field 1.

Tracks $T_{-1}(0.1)$ to $T_{-1}(1.2)$ have a record of video signal of the front frame (frame $-1$), with the track $T_{-1}(0.1)$ recording the former half of field 0 of that frame, track $T_{-1}(0.2)$ recording the latter half of field 0, track $T_{-1}(1.1)$ recording the former half of field 1 of that frame, and track $T_{-1}(1.2)$ recording the latter half of field ,0. Similarly, four tracks $T_0(0.1)$ to $T_0(1.2)$ record the video signal of the present frame, with the former two tracks $T_{-1}(1.2)$ and $T_0(0.2)$ recording the field 0 and the latter two tracks $T_0(1.1)$ and $T_0(1.2)$ recording the field 1.

The slow-motion playback operation has a different tape speed from that of the normal playback operation, causing the scanning trace of the playback head to be skew with respect to the track, and therefore adjacent two tracks can possibly be overlaid. FIG. 5 show scanning traces $S_1$, $S_3$ and $S_5$ to $S_9$ of the recorded tracks $T_0(0.1)$ to $T_0(1.2)$ for the video signal of the present frame 0 during the quarter-speed slow-motion playback operation. The scanning trace $S_1$ is produced in the first revolution of the magnetic head drum for the present frame 0, and similarly the scanning traces $S_3$, $S_5$, $S_7$ and so on are those of the third, fifth, seventh, and successive scannings, with the even numbered scanning traces being omitted.

On assumption that the magnetic tape 16 is running at the speed which is ¼ of the normal playback speed in the direction indicated by the arrow A, the scanning trace $S_1$ produced by the first drum revolution overlaps with the track $T_0(0.1)$ in its former half section and overlies the track $T_{-1}(1.2)$ in its latter half section during the playback of the video signal for the present frame 0. As the magnetic tape 16 runs further in the direction indicated by the arrow A and the drum rotates for the second turn, third turn and so on, the scanning traces move to the right on the drawing on the magnetic tape 16 as shown by $S_5$, $S_7$, $S_9$ and so on. Consequently, in the first turn of the drum, the scanning trace $S_1$ overlaps with the hatched area of the last track $T_{-1}(1.2)$ of the front frame (frame $-1$). After that, in successive turns, the overlapping portions of the scanning traces on the track $T_{-1}(1.2$ decrease progressively, and in the fourth turn, the track $T_{-1}(1.2)$ is no more scanned, and other tracks $T_0(0.1)$ and $T_0(0.2)$ are now scanned in place of the $T_{-1}(1.2)$. In the eighth and following turns, the track $T_1(0.1)$ on which the former half of the leading field 0 of the rear frame (frame 1) is recorded is scanned for playback.

For the scanning trace $S_1$, the video signal is reproduced on the track $T_0(0.1)$ in the former half of $S_1$ and on the track $T_{-1}(1.2)$ in the latter half of $S_1$. For the successive scanning traces $S_2$, $S_3$ and so on, the period of video signal reproduction on the track $T_{-1}(1.2)$ decreases progressively, and for the scanning trace $S_4$, the video signal is reproduced on the track $T_0(0\ 2)$, instead. The scanning traces $S_1$ to $S_4$ cover the entirety of the track $T_0(0.1)$ for playback, and the scanning traces $S_5$ to $S_8$ cover the entirety of the track $T_0(0.2)$ for playback. The scanning trace $S_8$ is on the track $T_0(0.1)$ for the playback scanning. In this manner, the video signal for one field is reproduced through the eight playback scanning operations in the quarter-speed slow-motion playback mode.

Next, storing of the reproduced video signal into the frame memory in the slow-motion playback operation shown in FIG. 5 will be explained with reference to FIGS. 6A to 6E.

FIGS. 6A to 6E show the contents of the frame memory after the head drum has revolved an odd number of turns, with a symbol being appended to tracks of FIG. 5 in correspondence to the contents of record with the intention of indicating the tracks of FIG. 5 where the record is reproduced.

The frame memory has storage areas assigned to the fields (field 0 and field 1), and field records are stored in the respective storage areas in the order of reproduction. The storage areas in the frame memory for the fields (field 0 and field 1) will be called field 0 storage area and field 1 storage area.

For the scanning trace (not shown) which precedes the scanning trace $S_1$ in FIG. 5 by one, the frame memory stores the reproduced video signal from the track $T_{-1}(0.1)$ in the former half of the field 0 storage area and the video signal from the track $T_{-1}(0.2)$ in the latter half of the field 0 storage area. The frame memory further stores the reproduced video signal from the track $T_{-1}(1.1)$ in the former half of the field 1 storage area and the video signal from the track $T_{-1}(1.2)$ in the latter half of the field 1 storage area. With the frame memory storing these records, when the first revolution of the head drum starts for the present frame 0 on the scanning trace $S_1$, the signal reproduction takes place in about the former half section of the track $T_0(0.1)$, and the reproduced video signal is stored in about a quarter area following the starting address of the field 0 storage area of the frame memory. In about the latter half section of the scanning trace $S_1$, the signal reproduction takes place in about the latter half section of the track $T_{-1}(1.2)$ (hatched section), and the reproduced video signal is stored in about a last quarter area of the field 1 storage area of the frame memory in FIG. 6A. Since the same video signal as has been stored is recorded, there is no change in the stored contents.

Next, in FIG. 5, when the playback scanning has taken place along the scanning trace $S_2$ (not shown) and $S_3$ in the second revolution and third revolution of the head drum, the track $T_0(0.1)$ has its playback area increasing progressively. Also in the frame memory, in the former half of the field 0 storage area, the track $T_0(0.1)$ has its storage area for reproduced video signal increasing progressively as shown in FIG. 6B. Simultaneously, the track $T_{-1}(0.1)$ of the front frame (frame $-1$) has its playback area decreasing, and the range of storing in the field 1 storage area of the frame memory decreases progressively.

In this manner, as the magnetic tape 16 runs, the track $T_0(0.2)$ is rendered the playback scanning. In the fifth revolution of the head drum, the former half of the field 0 storage area of the frame memory stores the video signal which has been reproduced from the entirety of the track $T_0(0.1)$, and the latter half stores in its about a quarter area the video signal which has been reproduced from the former half of the track $T_0(0.2)$, as shown in FIG. 6C. In the seventh revolution of the head drum, the track $T_0(0.2)$ has its playback area expanding, causing the storage area for the video signal from the track $T_0(0.2)$ in the field 0 storage area of the frame memory to expand as shown in FIG. 6D, and in the eighth and ninth revolutions of the head drum, the field 0 storage area of the frame memory stores the reproduced video signal from the entirety of the track $T_0(0.1)$, and the field 1 storage area stores the video signal of the field 1 reproduced on the track $T_0(1.1)$ as shown in FIG. 6E.

The frame memory has its store address for the reproduced video signal specified on the basis of the ID signal which is appended to each block. During the write operation of the frame memory described above, it is read out concurrently. The frame memory is read out alternately for the field 0 storage area and field 1 storage area, and a slow-motion playback video signal of one frame made up of the field 1 and field 0 is retrieved.

The time length in which the head drum turns twice is equal to one field period of the video signal, as mentioned above, and accordingly a four revolution period of the head drum is equal to one frame period. On this account, in the case of the quarter-speed slow-motion playback for the frame memory which has the write operation as shown in FIGS. 6A to 6E, the time length expended for rewriting the playback video signal for one frame is equal to the time length when the head drum makes 16 turns, and accordingly the frame memory is read out four times (16 divided by 4) to produce the video signal for four frames. Namely, during the period when the video signal for one frame is retrieved from the magnetic tape 14, the video signal for four frames is read out of the frame memory, thereby accomplishing the quarter-speed slow-motion playback operation.

SUMMARY OF THE INVENTION

However, in the above-mentioned slow-motion playback operation, a video signal of other frame besides a certain frame can possibly be reproduced at the same time during the playback period for one field, and in this case a blot will emerge in the reproduced displayed picture in a moving portion in which the video signals of moving picture vary between frames.

As shown in FIGS. 6A to 6E, when reading of one frame starts in the state of memory shown in FIG. 6A, the reading for one frame takes a time length of four revolutions of the head drum, and therefore reading of the next frame will start in the state of memory shown in FIG. 6C and reading of the successive frame will start in the state of memory shown in FIG. 6E.

During the period of eight revolutions of the head drum shown in FIGS. 6A to 6E, writing takes place in the field 0 storage area of the frame memory, and therefore the retrieved video signal of the field 0 contains the mixture of field 0 of the present frame 0 reproduced on the magnetic tape 16 and field 0 of the front frame (frame $-1$) which precedes the present frame 0 by one frame. Namely, when reading of a certain frame starts in the state of memory shown in FIG. 6A and reading of the next frame starts in the state of memory shown in FIG. 6C, the field 0 of the video signal read out of the field 0 storage area of the frame memory contains by mixing the video signal reproduced on the track $T_{-1}(0.1)$ for the front frame $-1$) in the third drum revolution. Whereas, in the state of memory shown in FIG. 6C, the area of the frame memory which has stored the video signal reproduced on the track $T_{-1}(0.1)$ is overwritten by the video signal reproduced on the track $T_0(0.1)$ of the present frame.

As concerns the slow-motion playback picture, when a picture reproduced on the track $T_{-1}(0.1)$ is displayed in field 0 of a certain frame period of the video signal retrieved from the frame memory, a playback picture from the track $T_0(0.1)$ is displayed in the same place for field 0 in the next frame period.

Between the picture recorded on the track $T_{-1}(0.1)$ and the picture recorded on the track $T_0(0.1)$, there is a time difference equal to one frame period (1/30 second in the NTSC system). On this account, if these pictures include a moving portion which causes a time difference, it creates a positional difference between pictures of contiguous frames that are displayed in the same place in a slow-motion playback picture, resulting in the emergence of a blot.

Generally, in the slow-motion playback operation at a 1/n (when n is an integer greater than or equal to 2) tape speed, a satisfactory slow-motion playback picture is obtained by the repetition of a frame of the same content of picture for n times. However, the constant of picture changes during the n-time repetitions of a frame, creating a difference in position or size in the displayed picture, resulting in the emergence of a blot.

An object of this invention is to provide, for a digital signal processing apparatus, a method and device for signal processing capable of reproducing a satisfactory playback signal by preventing the deterioration of the reproduce signal quality in the playback operation at a tape speed different from the normal playback tape speed.

Another object of this invention is to provide, for a digital video signal processing apparatus, a method and device for signal processing capable of reproducing a satisfactory playback picture by preventing the emergence of a blot in the playback picture in the slow-motion playback operation of the digital video signal.

In order to achieve the above objectives, according to one aspect of this invention, the signal processing device for a digital signal reproduction apparatus comprises a first memory which stores reproduced digital signals sequentially, a circuit which identifies the attribute of each reproduced digital signal, a write control circuit which detects that a digital signal in certain unit length among the digital signals stored in the first memory has a certain same attribute and produces a write signal on detecting the same attribute, and a second memory which is connected to the first memory and responds to the write signal to store, in the first memory, the digital signal having the certain unit length and detected to have the same attribute.

In operation, writing to the second memory does not take place until a certain amount of digital signals with the same attribute have been stored in the first memory, and at the time of the certain amount of storage in the first memory, the certain amount of digital signals with the same attribute are stored in the second memory.

According to another aspect of this invention, the signal processing device for a digital video signal reproduction apparatus comprises a first memory which stores reproduced digital video signals sequentially, a circuit which identifies the frame to which each reproduced digital video signal belongs, a write control circuit which detects that digital video signals in certain unit length among the digital video signals stored in the first memory belong to the certain same frame and produces a write signal on detecting the presence in the same frame, and a second memory which is connected to the first memory and responds to the write signal to store, in the first memory, the digital video signals in the certain unit length detected to belong to the same frame.

In operation, writing to the second memory (field memory) does not take place until digital video signals of the same frame and same field have been stored for the amount of one field in the first memory (frame memory), and at the time of one-field storage in the first memory, digital video signals for one field for the same frame and same field are stored in the second memory and held in it until the next writing takes place. On this account, digital video signals read out of the second memory are signal components of the same frame and same field, and therefore no blot emerges in the playback picture. Accordingly, in the digital video signal playback operation at a tape speed different from the recording tape speed, a step-feed slow-motion playback picture can be produced without the emergence of a blot by selectively holding, in the field memory, the video signals of the same field which have completed updating in the frame memory.

BRIEF DESCRIPTION OF THE DRAWINGS

FIG. 5 is a diagram showing in a sense of model the track pattern and scanning trace on the magnetic tape of the digital VTR formed in the slow-motion playback operation;

FIGS. 6A to 6E are diagrams showing the transition of write state of the frame memory for the signal reproduced on the magnetic tape;

DESCRIPTION OF THE PREFERRED EMBODIMENTS

Embodiments of this invention will be described with reference to the drawings. The component blocks referred to by the same symbols throughout the drawings are assumed to have the same functions.

Figure 1:
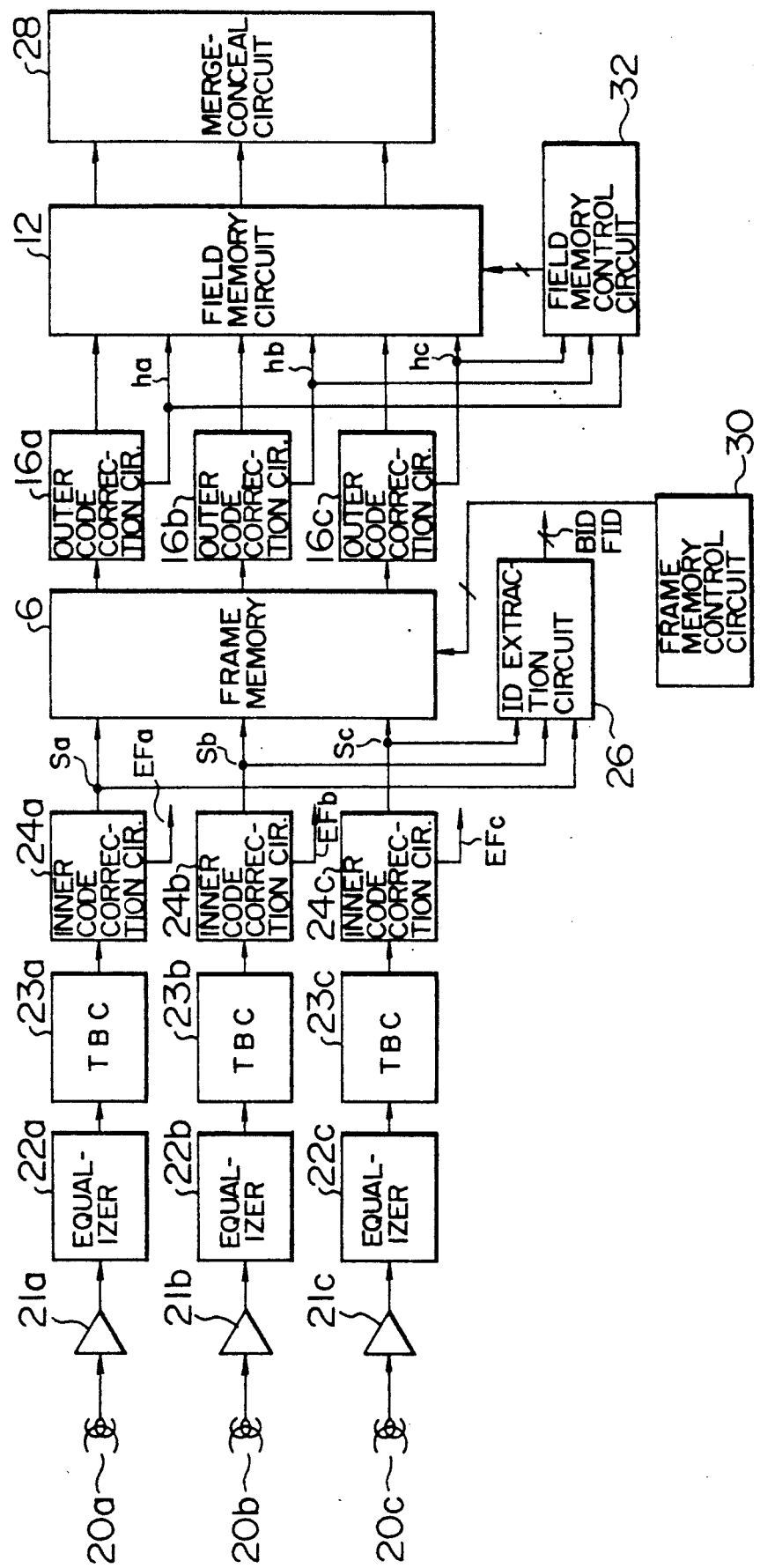
FIG. 1 is a block diagram showing an example of the playback system of a digital VTR to which the present invention is applied.

FIG. 1 is a block diagram showing, as an example, the three-channel playback system of a digital VTR to which the inventive method and device of digital video signal reproduction is applied. In the figure, indicated by 20a, 20b and 20c are playback heads for channel 1, 2 and 3, respectively, 21a, 21b and 21c are preamplifiers, 22a, 22b and 22c are equalizers, 23a, 23b and 23c are time base correctors (TBC), 24a, 24b and 24c are inner code correction circuits, 6 is a frame memory, 16a, 16b and 16c are outer code correction circuits, 12 is a field memory circuit, and 28 is a merge-conceal circuit. 26 is an ID extraction circuit which extracts the index signals (a field ID (FID) indicative of the field number of each field and a block ID (BID) indicative of the block number of each block) from the reproduced video signals Sa, Sb and Sc which have been rendered the block-wise error detection and correction process by the inner code correction circuits 24a–24c. 32 is a field memory control circuit which controls the writing and reading of the reproduced video signals to/from the field memory circuit 12 in accordance with the conceal signals ha, hb, hc, etc. provided by the outer code correction circuits 16a-16c. Each of the inner code correction circuits 24a-24c produces a block-wise error flag EF when the error of the input block of the respective channel has exceeded the correctable range. Indicated by 30 is a frame memory control circuit which controls the writing and reading of the reproduced video signals Sa-Sc to/from the frame memory 6. The frame memory circuit 12 delivers the stored video data to the merge-conceal circuit 28 sequentially.

Figure 2:
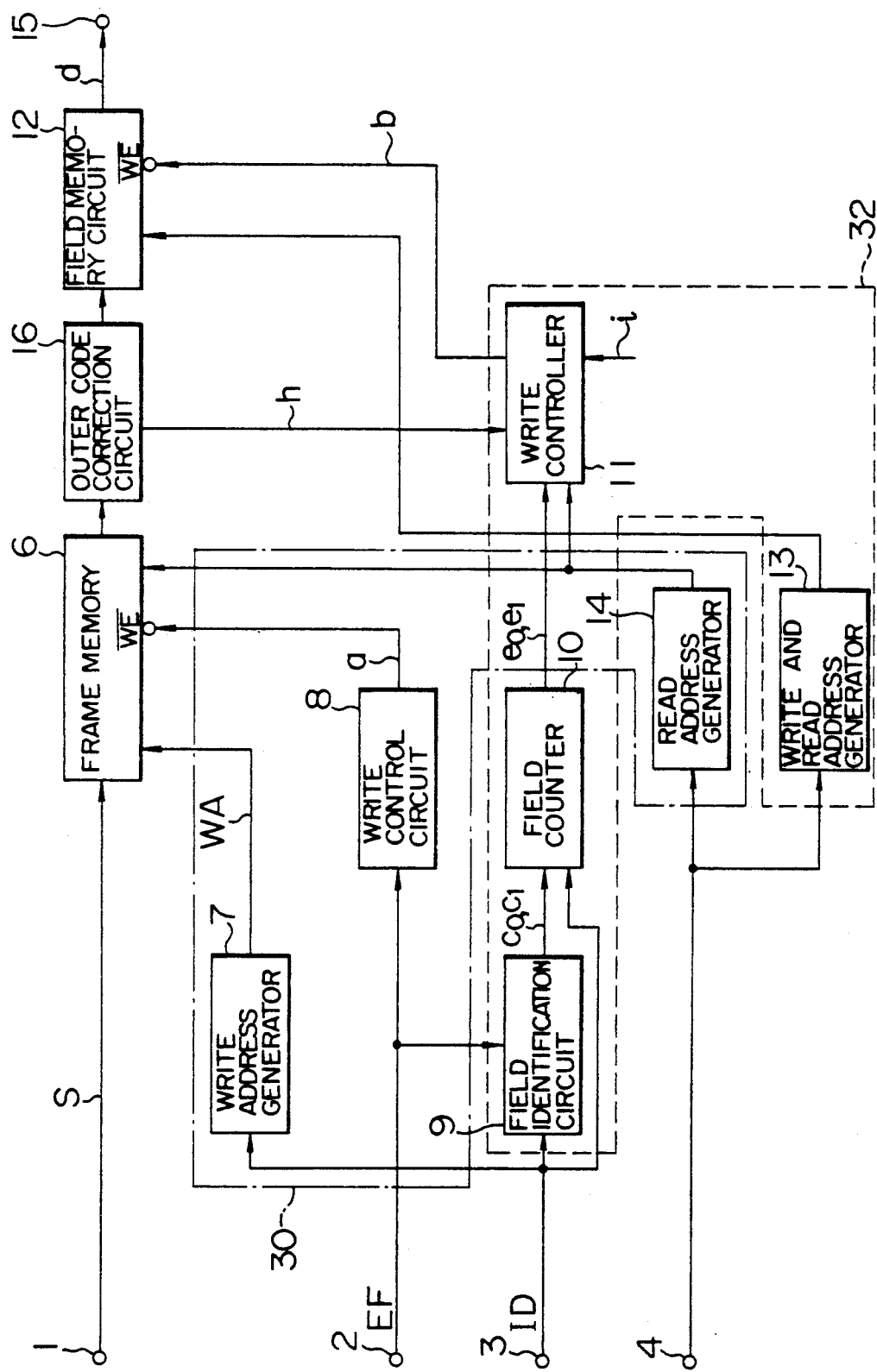
FIG. 2 is a block diagram of the digital video signal reproduction apparatus based on an embodiment of this invention.

FIG. 2 is a block diagram of the method and device of digital video signal reproduction based on an embodiment of this invention. The following explains an example of one-channel arrangement for the sake of simplicity of explanation. In the figure, indicated by 7 is a write address generator for the frame memory, 8 is a write control circuit for the frame memory, 9 is a field identifying circuit, 10 is a field counter, 11 is a write control circuit for the field memory, 13 is a write/read address generator for the field memory, 14 is a read address generator for the frame memory, and 15 is an output terminal.

In the figure, the input terminal 1 receives a video signal S which has been reproduced as shown in FIG. 5 and rendered the error detection and correction process by the inner-code correction circuit. 24, and the signal is stored in the frame memory 6. The video signal S is segmented into blocks (e.g., with a length of horizontal period), so that the block-wise error detection and correction process is conducted and the block-wise field ID ((FID) and block ID (BID)) is appended to it. The input terminal 2 receives the error flag EF from the inner code correction circuit 24 in response to the entry of a block having an error in excess of the correctable range to the input terminal 1, and the input terminal 3 receives the field ID and block ID provided by the ID extraction circuit 26 after being separated from the reproduced video signal S. The input terminal 4 receives a frame pulse synchronizing with each frame of the reproduced video signal.

The error flag EF received on the input terminal 2 is delivered to the write control circuit 8, which then produces a write enable signal a which is low during the period of entry of an error-incorrigible block from the input terminal 1 and is high during the period of entry of an error-free block or error-corrected block from the input terminal 1. The signal is applied to the write enable terminal WE of the frame memory 6. By this arrangement, the frame memory 6 is disabled for writing in response to the entry of an error-incorrigible block on the input terminal 1. Consequently, only error-free blocks from the input terminal 1 are stored in the frame memory 6. The ID signal including the field ID and block ID entered through the input terminal 3 is delivered to the write address generator 7, which then generates a write address WA indicative of the storage location in the frame memory 6 for each block entered through the input terminal 1 and it is delivered to the frame memory 6.

The field ID included in the ID signal received on the input terminal 3 is delivered to the field identifying circuit 9, which identifies whether a block received on the input terminal 1 is for field 0 or field 1. At the same time, the circuit 9 receives the error flag EF to produce field flags $C_0$ and $C_1$ indicative of the result of field identification, e.g., field flag $C_0$ for an error-free field 0 block and field flag $C_1$ for an error-free field 1 block, respectively.

Figure 4:
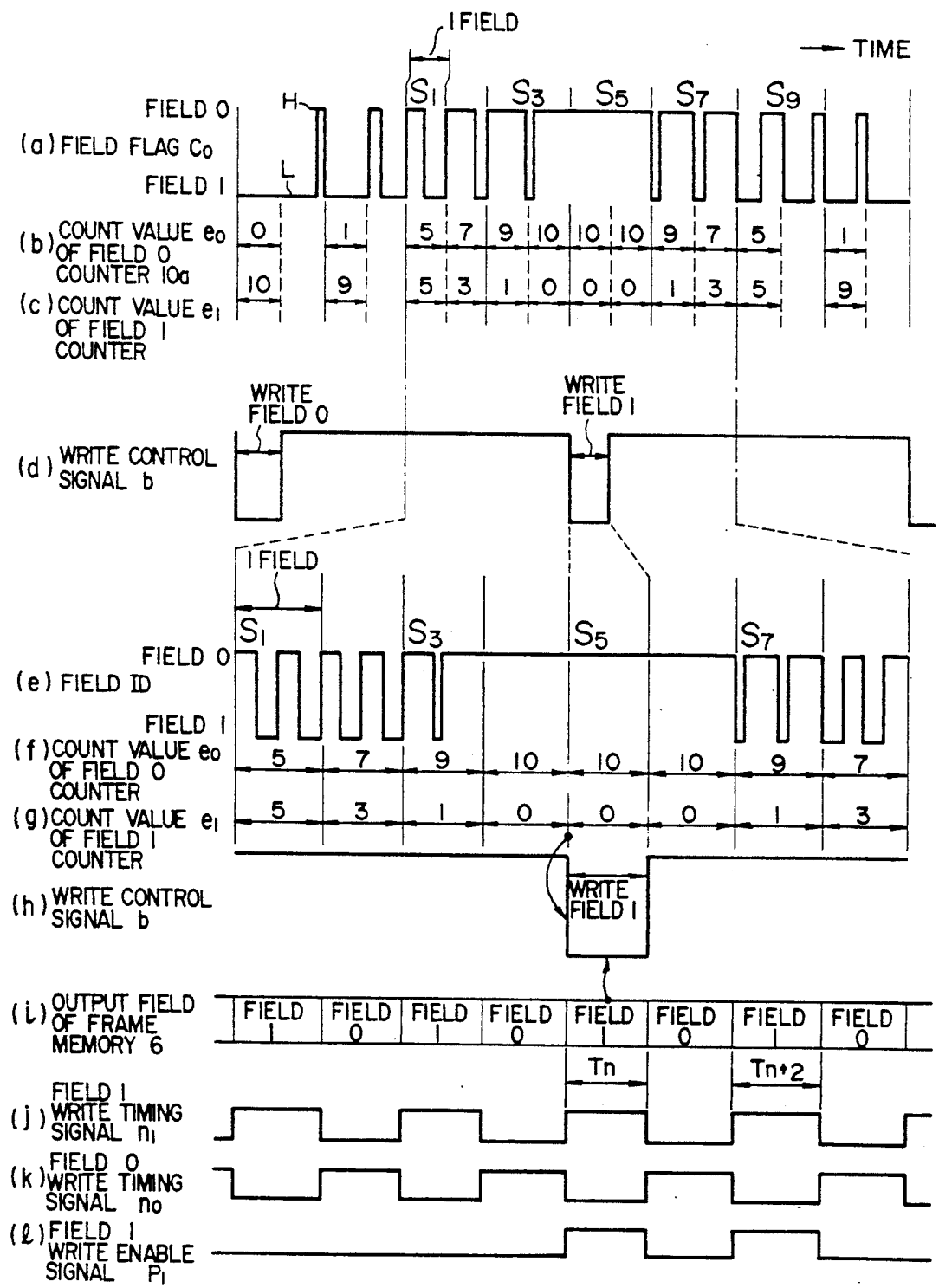
FIG. 4 is a set of waveform diagrams used to explain the write operation to the field memory.

(a) of FIG. 4 shows an example of the field flag $C_0$ which at high level represents an error-free field 0 block and represents at low level an erroneous field 1 or field 0 block. The field flags $C_0$ and $C_1$ are delivered to the field counter 10. The field counter 10 distinguishes field flags C based on the field of the reproduced video signal S which is entered through the input terminal 1, and counts the number of field flags $C_0$ and $C_1$ of field 0 and field 1 in each field period. The counter 10 produces field count data $e_0$ and $e_1$ indicative of the flag counts, and delivers the data to the write controller 11. The numerals in (b) and (c) of FIG. 4 are count values $e_0$ and $e_1$ in one field period provided by the field counter. The numerals shown in (b) of FIG. 4 are the total number of error-free field 0 blocks in one field, and the numerals shown in (c) of FIG. 4 are the total number of error-free field 1 blocks in one field. The read address generator 14 generates a read address to be applied to the frame memory 6 and a write field address to be applied to the write controller 11 each synchronizing with the frame pulse. The write and read address generator 13 generates a write address and a read address to be applied to the field memory 12 in synchronism with the frame pulse.

Next, the arrangement and operation of the field identifying circuit 9, field counter 10, write control circuit 11, and field memory circuit 12 shown in FIG. 3 will be explained using FIGS. 3 and 4. The field identifying circuit 9 has two AND gates 9a and 9c and two inverters 9b and 9d, and it receives the field ID and error flag EF. For example, the field ID is high for the field 0 and it is low for the field 1, and the error flag EF goes high when an error has been detected. Accordingly, through the arrangement of these gate circuits 9a-9d as shown in the figure, the AND gates 9a and 9c produce the above-mentioned field flags $C_0$ and $C_1$.

The field conter 10 has a field 0 counter 10a and field 1 counter 10b, which receive the field flags $C_0$ and $C_1$, respectively, on their enable terminals ET. The field counters 10a and 10b receive the block ID on their clock inputs CK, and receive a field clear signal, which is the field ID for example, on their clear inputs CL. Accordingly, the field counters 10a and 10b produce the total number $e_0$ of blocks within the segment of error-free field 0 in one field and the total number $e_1$ of blocks within the segment of error-free field 1 in one field, respectively.

The field memory circuit 12 has a switch 12a and a field memory 12b. The switch 12a delivers one of the reproduced video signal which has been error-corrected by the outer code correction circuit 16 and the output of the field memory 12b selectively to the field memory 12b in response to the write control signal b. Accordingly, when the switch 12a selects the output of the field memory 12b, the field memory delivers the same field continuously. Otherwise, when the switch 12a selects the output of the outer code correction circuit 16, the contents of the field memory 12b is replaced with it.

The write control circuit 11 has a field 0 signal generator 11a, comparators 11b and 11c, AND gates 11d and 11f, an inverter 11e, a NOR gate 11g, and NAND gate 11j, a negative AND gate 11i and a negative OR gate 11k. The field 0 signal generator 11a produces a field 0 signal in synchronism with a field memory read address signal provided by the read address generator 14, and delivers it to the AND gate 11d as a field 0 write timing signal $n_0$ (shown by (k) in FIG. 4), and to the AND gate 11f by way of the inverter 11e as a field 1 write timing signal $n_1$ (shown by (j) in FIG. 4). The timing signals $n_1$ and $n_0$ go high only when field memory 6 reads out the field 1 and field 0, respectively.

The comparators 11b and 11c produce high-level signals to be delivered to the AND gates 11d and 11f, respectively, on detecting that the count data $e_0$ and $e_1$ provided by the counters 10a and 10b are low. Accordingly, the AND gate 11d produces a field 0 write enable signal $P_0$ which is high during the period of field 0 following the field 1 in which the count data $e_0$ has become low. Similarly, the AND gate 11f produces a field 1 write enable signal $P_1$ (shown by (e) in FIG. 4) which is high during the period of field 0 following the field 0 in which the count data $e_1$ has become low. These outputs of the AND gates 11d and 11f are inverted by being fed through the NAND gate 11g and delivered to one input of the gate 11i as a shutter signal l. The gate 11i also receives on its another input a slow-motion playback signal i which is low in the slow-motion playback mode, for example. The NAND gate 11j receives the conceal flag h from the outer code correction circuit 16 and the motion playback signal i. Accordingly, the gate 11i produces a low-level signal when the shutter signal l is low (indicative of the write mode for the field of reproduced signal to the field memory) in the slow-motion playback mode, and the gate 11j produces a low-level signal when the conceal signal is active and the mode is not slow-motion playback. These signals are delivered to the switch 12a by way of the gate 11k as a write control signal b. Accordingly, the write control signal b is synchronous with the field 0 (or field 1) write enable signal $P_0$ ($P_1$) during the slow-motion playback mode. The switch 12a delivers the reproduced output signal from the correction circuit 16 to the field memory 12b during a period when the write control signal b is low.

The following explains using FIG. 4 the write operation of the above-mentioned circuit arrangement for the reproduced video signal from the frame memory to the field memory circuit 12 in the slow-motion playback mode.

In the variable speed playback mode, field data of the reproduced signal S to the field memory has a cycle from the state of only field 1, to the state of the mixture of field 0 and field 1, to the state of only field 0, to the state of the mixture of field 0 and field 1, and to the state of only field 1. The state of storage for only one of field 0 or field 1 in the field memory is equivalent to the state of writing to the field 1 storage area for the reproduced signal S during the first through seventh revolution of the head drum, as shown in FIGS. 6A to 6D. In this case, the frame memory 6 reads out data in the field 1 storage area and field 0 storage area alternately (shown by (i) in FIG. 4). In case the field 1 storage area is not written at all, the reproduced signal of field 1 should have been updated in the memory, and therefore it is not written to the memory 6. On this account, by reading out the reproduced field 1 signal in the field 1 storage area, it becomes possible to write data which is not the mixture of data of different frames to the field memory. However, the time in which writing to one field storage area does not take place at all lasts only a few fields (depending on the tape speed, e.g., two fields or less at a quarter tape speed), and therefore in order to retain a satisfactory picture quality it is necessary to hold data which is not the mixture of data of different frames until the state comes in which writing to the same field storage area does not take place at all. For holding the data, the field memory 12b is used, and when one of field 0 or field 1 has its count data $e_0$ or $e_1$ becoming low, the control signal b is made low at the read timing of the frame memory 6 for the data of the field with its count data being low, and it is written to the field memory 12b for only one field and the remainder is held. In the condition of FIGS. 6A to 6D, the frame memory 6 reads out the same field data from the field 1 storage area (during the periods $T_n$ and $T_{n+2}$ shown by (i) in FIG. 4). Accordingly, the field memory 12b may write the same field signal again for the field data which has been written once (e.g., in the period $T_{n+2}$ after the period $T_n$). Namely, in the period $T_{n+2}$ of a high level of the field 1 write enable signal $P_1$, the write control signal b may be set to a low level to thereby write the field 1 to the field memory again.

In this manner, the write operation to the field memory takes place as if it is a shutter operation, and therefore when the count data $e_1$ or $e_0$ in either field (field 1 in FIG. 4) has gone low, the field memory write control signal b goes low in the next field period (writing at low and holding at high). In this case, the frame memory 6 has its read/write timing set so that the signal which has been written to it is read out by being retarded by one field, and therefore a field immediately after the count data of the field counter has gone low is written to the field memory 12b. Accordingly, also in FIG. 4, a write control signal b having a one-field width is generated in the next field period after the count data has gone low.

In this manner, the operation cycles from writing to holding and to writing, and the output signal d in FIG. 2 is delivered to the output terminal 15 as a step feed video signal, and is supplied to the merge-conceal circuit 28. In consequence, a field-slow picture without a blot can be produced as intended by the present invention.

Figure 7:
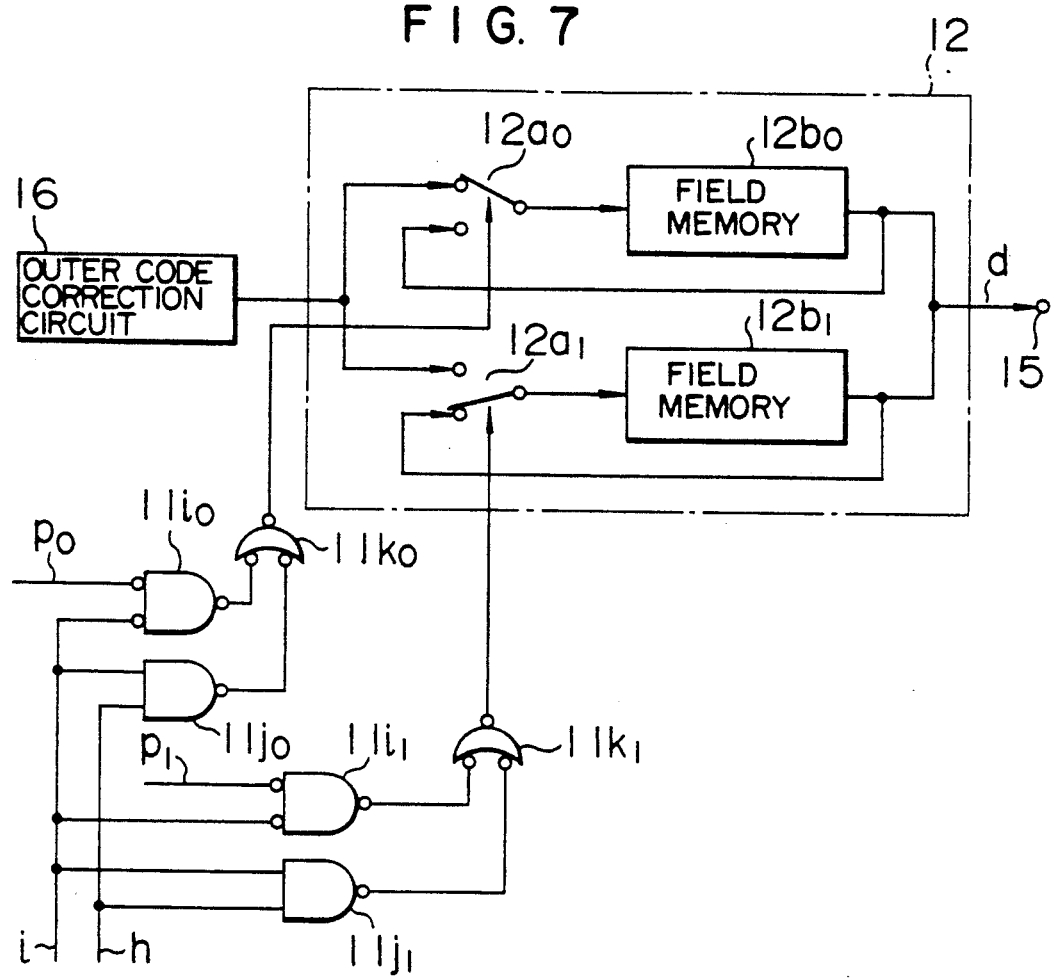
FIG. 7 is a block diagram showing the arrangement of the principal portions of the digital video signal reproduction apparatus based on another embodiment of this invention.

Although in the foregoing embodiment one field memory 12b is used to store alternately the reproduced video signal of field 0 or field 1 which has been updated, an alternative arrangement for the field memory is to provide a field memory $12b_0$ for field 0 and a field memory $12b_1$ for field 1 as shown in FIG. 7 so that the video signals of field 0 and field 1 which have been updated are stored in them. In this case, as will be appreciated from FIG. 7, the field 0 write enable signal $P_0$ and field 1 write enable signal $P_1$ are supplied as write control signals $b_0$ and $b_1$ to the switches $12a_0$ and $12a_1$ by way of gates $11i_0$ through $11k_0$ and gates $11i_1$ through $11k_1$. By this arrangement, in the slow-motion playback operation, the field memories $12b_0$ and $12b_1$ deliver reproduced pictures of field 0 and field 1 alternately to the output terminal 15 even during the updating operation for the field 0 and field 1 by the frame memory 6.

Figure 3:
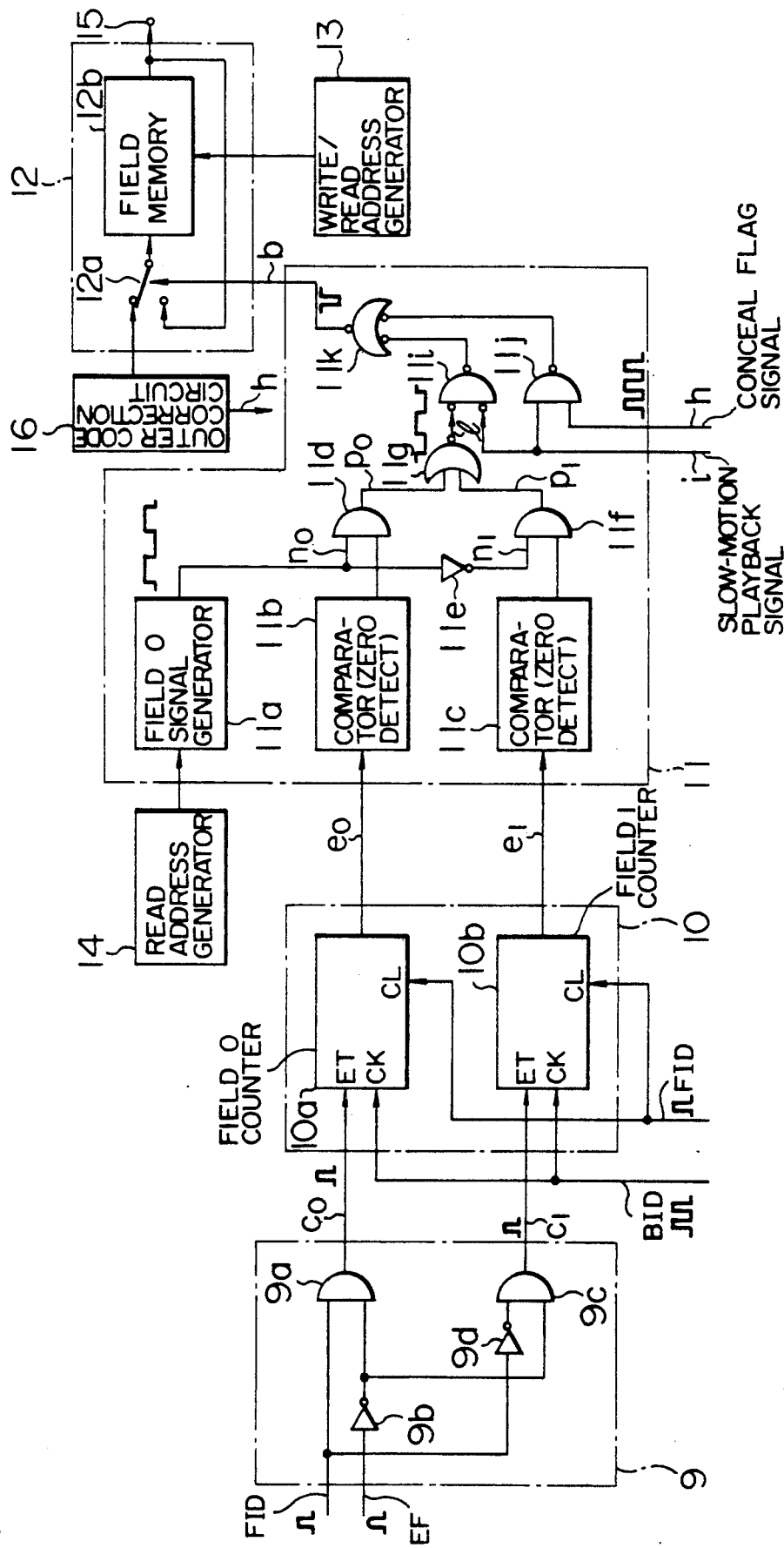
FIG. 3 is a block diagram of the memory control circuit shown in FIG. 2.
Figure 8:
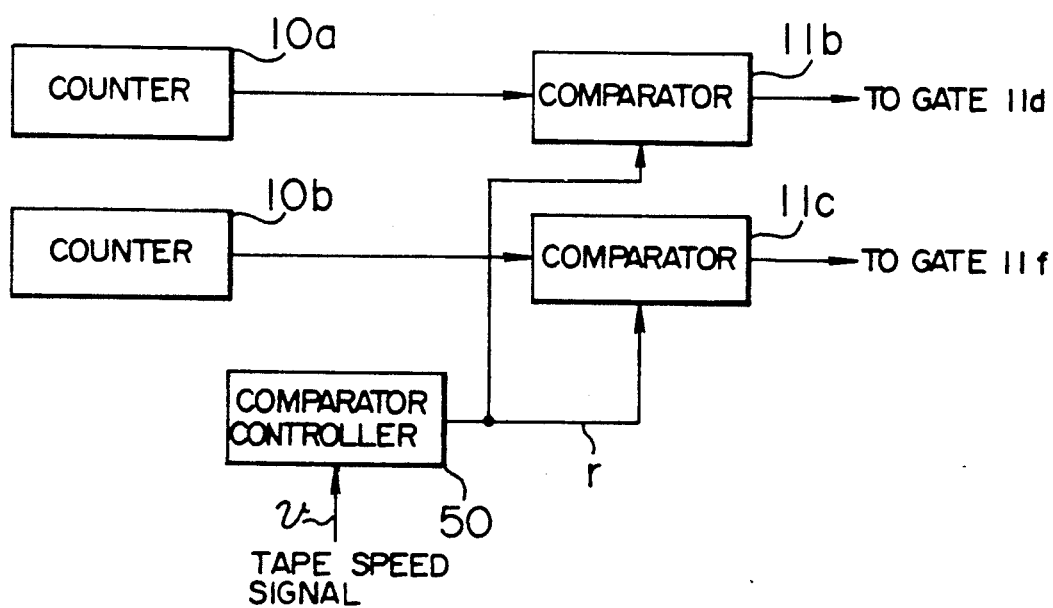
FIG. 8 is a block diagram showing the arrangement of the principal portions of a further embodiment of this invention.

Although in the embodiment of FIG. 3 the end of field updating by the frame memory is judged to produce the write control signal b when the count data $e_0$ or $e_1$ of the counter 10 has become low, the signal b may be produced at the time point when the count data $e_0$ or $e_1$ has become a prescribed number, which is greater than or equal to zero, which represents the tape speed. FIG. 8 is a block diagram of the field memory control circuit 32 based on the above-mentioned arrangement, in which indicated by 50 is a comparator controller which evaluates a reference value r for a signal v which represents the tape speed and delivers it to comparators 10$b'$ and 10$c'$. For example, the comparator controller produces number 0 for r when the tape speed v is the prescribed speed or lower, or it produces a number greater than or equal to 1 when the tape speed exceeds the prescribed speed. This arrangement enables the field memory to store fields which has been updated properly even at a higher tape speed.

Figure 9:
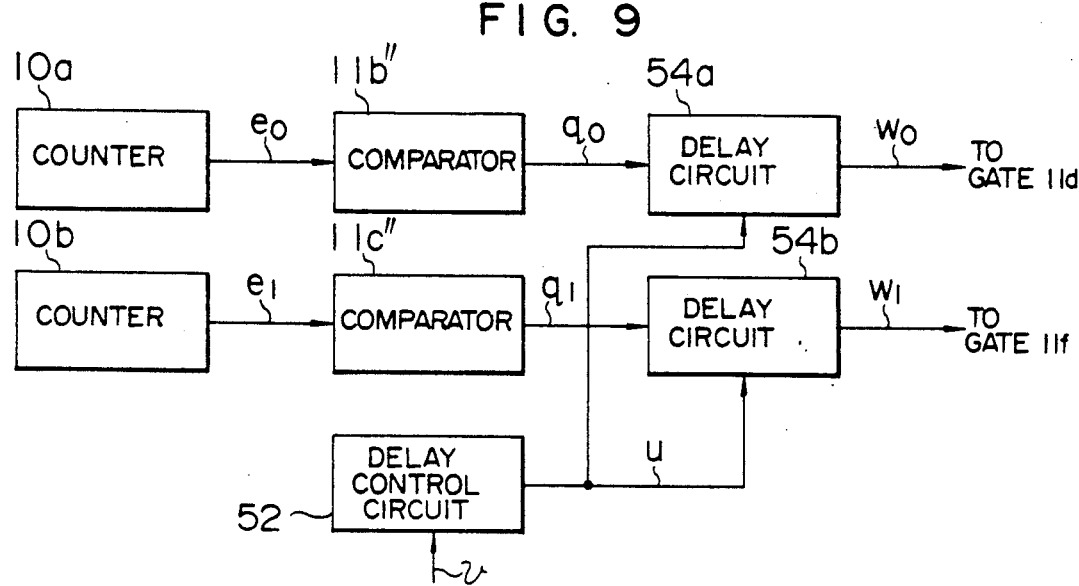
FIG. 9 is a block diagram showing the arrangement of the principal portions of a further embodiment of this invention.
Figure 10:
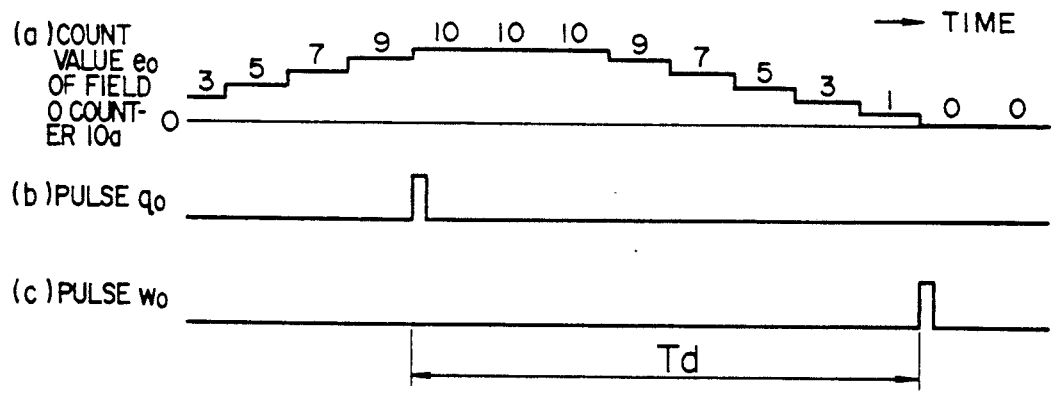
FIG. 10 is a timing chart used to explain the operation of the arrangement shown in FIG. 9.

FIG. 9 is a block diagram of the principal portion of the field memory control circuit 32 based on another embodiment of this invention, and FIG. 10 a timing chart used to explain the operation of the circuit. The circuit delivers the write control signal b on expiration of a prescribed time length after the count data $e_0$ and $e_1$ of the counters 10$a$ and 10$b$ have reached a prescribed value (e.g., maximum value 10). The prescribed time length is determined uniquely since the time interval when the count data reaches the prescribed value is constant so far as the tape speed is constant.

In FIG. 9, the comparators 11$b''$ and 11$c''$ produce pulses $q_0$ and $q_1$ when the respective count data $e_0$ and $e_1$ have reached a prescribed value, e.g., maximum value 10, and deliver the pulses to delay circuits 54$a$ and 54$b$.

The delay circuits 54$a$ and 54$b$ retard the pulses $q_0$ and $q_1$ for a prescribed time length Td to produce output pulses $w_0$ and $w_1$, and deliver them to the gates 11$d$ and 11$f$. The delay circuits 54$a$ and 54$b$ have their delay time Td controlled by the delay control circuit 52 in accordance with the tape speed v, and accordingly the pulses $w_0$ and $w_1$ are produced by being timed to the completion of updating of a corresponding field to the frame memory 6.

Figure 11:
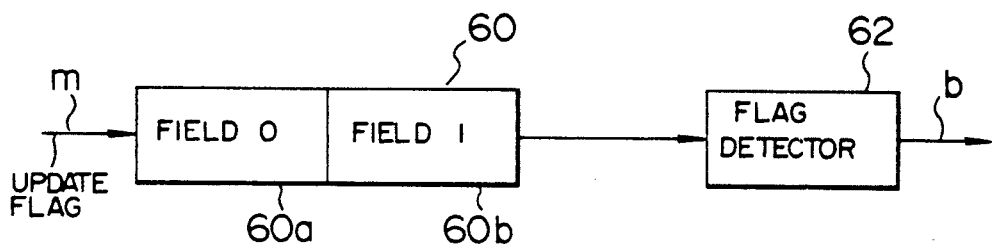
FIG. 11 is a block diagram showing the arrangement of the principal portions of a further embodiment of this invention.

Although in the foregoing embodiments the field flags $C_0$ and $C_1$ are counted with the counter 10 to produce the write control signal b which judges the end of updating, an alternative scheme is to provide a flag memory 60, as shown in the embodiment of FIG. 11, so as to judge the end of updating by using a flag which cycles between 1 and n (where n is a natural number) for each frame. For example, for frame 0, a flag n−2 is stored in the field 0 memory 60$a$ (or field 1 memory 60$b$) each time a block is stored in the frame memory, and it is detected by a flag detector 62 that whether all flags of the memory 60$a$ (or 60$b$) (all flags of blocks in one field) have become equal (i.e., n−2) thereby to produce the signal b when the condition is met. The flag is n−1 for the next frame 1, and it is n for the successive frame 2.

A further alternative is to set a pointer in a pointer memory indicative of whether the frame memory has been written for each block and for each field thereby to produce the write control signal b to the field memory by testing whether all pointers have been set for one field.

The reproduced video signals read out of the frame memory 6 do not involve error. Namely, the first correction code is appended to one horizontal period in general, and therefore no error is included in each horizontal period of one field period. In case the second correction code is appended for each pixel in the direction perpendicular to the horizontal period, if no error is detected as a result of verification for the second error correction code for one field, it implies that the reproduced video data for the entire one field includes no error. Accordingly, the signal b may be produced in response to the above-mentioned detection.

In order that, in the normal speed playback operation, a block, which has been judged to be incorrigible by the outer code correction circuit 16 provided next to the frame memory, is not stored in the field memory 12$b$, the switch 12$a$ (shown in FIG. 3) may be disconnected from the output of the correction circuit 16 and connected to the output of the field memory 12$b$.

Although in the foregoing embodiment the judgement in that the updating has surely completed when the count value of the field counter 10 in a specific field period has become zero is made, playback errors occurring by change in several consecutive fields will possibly result in the failure of updating for specific portions of the picture. In this case, the arrangement may be made such that the error flag detected by the outer code correction circuit 16 is held together with the video signal in the field memory, so that the incomplete updated portion is synthesized from normal surrounding pixels thereby to mend the reproduce picture.

Although in the foregoing embodiments the end of updating of each field to the memory 6 is detected before it is stored in the memory 12, an alternative scheme is to detect the end of updating of one frame to the memory 6 and store the frame in the memory 12.

Although the foregoing embodiments are the case of one channel, a playback apparatus for multiple channel signals may be provided with the foregoing arrangement in correspondence to the channels.

The present invention is not confined to deal with a digital video signal, but it is also applicable to a playback apparatus for a digital audio signal.

We claim:

1. A signal reproduction device for use in a digital signal reproduction apparatus which reproduces digital video signals recorded on a recording medium with a reproduction head, said device comprising:
   first memory means for sequentially storing digital video signals reproduced by said reproduction head;
   means for identifying a field of a digital video signal reproduced by said reproduction head;
   write control means for judging, based on a result of the identification performed by said identification means, whether digital video signals of a prescribed unit length included in said digital video signals stored in said first memory means, have a same field as said identified field, and producing a write signal in response to the judgement, and
   second memory means connected to said first memory means for storing said digital video signals of the prescribed length judged to have the same field as said identified field in response to said write signal.

2. A signal reproduction device according to claim 1, wherein said write control means comprises:
   means for producing said write signals in response to said judgement that said digital video signals with the prescribed unit length and having the same field as said identified field are not included among said digital video signals stored in said first memory means.

3. A signal reproduction device according to claim 1, wherein said write control means comprises:
   means for calculating a time length that is derived from a period in which said digital video signals having the same field as said identified field have a prescribed proportion among said digital video signals of the prescribed unit length stored in said first memory, and producing said write signal on expiration of the calculated time length after a number of said digital video signals have exceeded the prescribed proportion.

4. A signal reproduction device according to claim 1, wherein said write control means comprises:
   means for producing said write signal in response to when a number of digital video signals with the same field as said identified field among the digital video signals of the prescribed unit length that are stored in said first memory means is greater than or equal to a prescribed value.

5. A signal reproduction device for use in a digital signal reproduction apparatus which reproduces digital signals recorded on a recording medium with a reproduction head, said device comprising:
   first memory means for sequentially storing digital signals reproduced by said reproduction head;
   means for identifying a field of a digital signal reproduced by said reproduction head;
   write control means for judging, based on a result of the identification performed by said identification means, whether digital signals of a prescribed unit length included in said digital signals stored in said first memory means, have a same field as said identified field, and producing a write signal in response to the judgement;
   second memory means connected to said first memory means for storing said digital signals of the prescribed length judged to have the same field as said identified field in response to said write signal; and
   switch means which is responsive to said write signal, said switch means delivers the output of said first memory means to the input of said second memory means when said recording medium has a normal playback speed, or delivers the output of said second memory means to the input thereof during the absence of said write signal when said recording medium has a playback speed other than the normal speed, and is responsive to said write signal to deliver the output of said first memory means to the input of said second memory means.

6. A signal reproduction device for use in a digital signal reproduction apparatus which reproduces digital signals recorded on a recording medium with a reproduction head, said device comprising:
   first memory means for sequentially storing digital signals reproduced by said reproduction head;
   means for identifying a field of a digital signal reproduced by said reproduction head;
   write control means for judging, based on a result of the identification performed by said identification means, whether digital signals of a prescribed unit length included in said digital signals stored in said first memory means, have a same field as said identified field, and producing a write signal in response to the judgement;
   second memory means connected to said first memory means for storing said digital signals of the prescribed length judged to have the same field as said identified field in response to said write signal;
   means for judging whether a digital signal reproduced by said reproduction head involves error, and inhibiting the writing of an erroneous digital signal to said first memory means in response to the judgement of the presence of an error.

7. A signal reproduction device according to claim 1, wherein said second memory means holds the contents thereof until said second memory means stores a digital signal from said first memory in response to said write signal.

8. A signal reproduction method for a digital signal reproduction apparatus which reproduces digital video signals recorded on a recording medium with a reproduction head, said method comprising the steps of:
   sequentially storing digital video signals reproduced by said reproduction head into first memory means;
   identifying a field of a digital video signal reproduced by said reproduction head;
   judging, based on a result of the identifying step, whether digital video signals of a prescribed unit length included in said digital video signals stored in said first memory, have a same field as said identified field, and producing a write signal in response to the judgement; and
   storing said digital video signals of the prescribed length judged to have the same field as said identified field into second memory means in response to said write signal.

9. A signal reproduction device for use in a digital video signal reproduction apparatus which reproduces digital video signals recorded on a recording medium with a reproduction head, said device comprising:
   first memory means for sequentially storing digital video signals reproduced by said reproduction head;
   means for identifying a frame to which a digital video signal reproduced by said reproduction head belongs;
   write control means for judging, based on a result of the identification performed by said identification means, whether digital video signals of a prescribed unit length included in said digital video signals stored in said first memory means, belong to the same frame as said identified frame, and producing a write signal in response to the judgement; and
   second memory means connected to said first memory means for storing digital video signals of the prescribed length judged to belong to the same frame as said identified frame, in response to said write signal.

10. A signal reproduction device according to claim 1, wherein said identification means comprises:
    means for identifying a frame to which said digital video signal reproduced by said reproduction head belongs;
    said write control means comprises means for producing said write signal in response to the judgement that digital video signals of the prescribed unit length included in digital video signals stored in said first memory means belong to the same frame as said identified frame, and producing a write signal in response to the judgement; and
    said second memory means comprises means for storing said digital video signals which have been judged to belong to the same frame as said identified field, in response to said write signal.

11. A signal reproduction device according to claim 10, wherein said wire control means further comprises:
    means for producing said write signal in response to a judgement that digital video signals of the same frame as said identified frame and the same field as said identified field are not included among digital video signals for one field which are stored continuously in said first memory means.

12. A signal reproduction device according to claim 10, wherein said write control means further comprises:
means for calculating a time length that is derived from a period in which the digital video signals with the same frame as said identified frame and the same field as said identified field have a prescribed proportion among digital video signals for one field which are stored continuously in said first memory, and producing said write signal on expiration of the calculated time length after a number of said digital video signals has exceeded the prescribed proportion.

13. A signal reproduction device according to claim 10, wherein said write control means further comprises:
means for producing said write signal in response to when a number of digital video signals of the same frame as said identified frame and the same field as said identified field among digital video signals for one field with the prescribed unit length, which are stored continuously in said first memory means, is greater than or equal to a prescribed value.

14. A signal reproduction device for use in a digital signal reproduction apparatus which reproduces digital signals recorded on a recording medium with a reproduction head, said device comprising:
first memory means for sequentially storing digital signals reproduced by said reproduction head;
means for identifying a field of a digital signal reproduced by said reproduction head;
write control means for judging, based on a result of the identification performed by said identification means, whether digital signals of a prescribed unit length included in said digital signals stored in said first memory means, have a same field as said identified field, and producing a write signal in response to the judgment;
second memory means connected to said first memory means for storing digital signals of the prescribed length judged to have the same field as said identified field in response to said write signal;
wherein said identification means comprises means for identifying a frame to which a digital signal reproduced by said reproduction head belongs;
said write control means comprises means for producing said write signal in response to the judgement that digital signals of the prescribed unit length included in digital signals stored in said first memory means, belong to the same frame as said identified frame, and producing a write signal in response to the judgement;
said second memory means comprises means for storing digital signals which have been judged to belong to the same frame as said identified frame, in response to said write signal; and
switch means which is responsive to said write signal, said switch means delivers the output of said first memory means to the input of said second memory means when said recording medium has a normal playback speed, or delivers the output of said second memory means to the input thereof during the absence of said write signal when said recording medium has a playback speed other than the normal speed, and is responsive to said write signal to deliver the output of said first memory means to the input of said second memory means.

15. A signal reproduction device for use in a digital signal reproduction apparatus which reproduces digital signals recorded on a recording medium with a reproduction head, said device comprising:
first memory means for sequentially storing digital signals reproduced by said reproduction head;
means for identifying a frame of a digital signal reproduced by said reproduction head;
write control means for judging, based on a result of the identification performed by said identification means, whether digital signals of a prescribed unit length included in said digital signals stored in said first memory means, have a same frame as said identified frame, and producing a write signal in response to the judgement;
second memory means connected to said first memory means for storing digital signals of the prescribed length judged to have the same frame as said identified frame in response to said write signal;
wherein said identification means comprises means for identifying a field to which a digital video signal belongs;
said write control means comprises means for producing said write signal in response to the judgement that digital signals of the prescribed unit length included in digital signals stored in said first memory means, belong to the same field as said identified field, and producing a write signal in response to the judgement;
said second memory means comprises means for storing digital signals which have been judged to belong to the same field as said identified field, in response to said write signal; and
means for judging whether a digital signal reproduced by said reproduction head involves error, and inhibiting the writing of an erroneous digital signal to said first memory means in response to the judgement of the presence of an error.

16. A signal reproduction device according to claim 9, wherein said second memory means holds the contents thereof until said second memory means stores digital video signals from said first memory means in response to said write signal.

17. A signal reproduction method for a digital signal reproduction apparatus which reproduces digital signals recorded on a recording medium with a reproduction head, said method comprising the steps of:
storing sequentially digital video signals reproduced by said reproduction head into first memory means;
identifying a frame to which a digital video signal reproduced by said reproduction head belongs;
judging, based on the result of the identifying step, whether all digital video signals with a prescribe unit length included in digital video signals stored in said first memory belong to a same frame as said identified frame, and producing a write signal in response to the judgement; and
storing digital video signals with the prescribed length and of the same frame as said identified frame into second memory means in response to said write signal.

18. A signal reproduction device according to claim 10, wherein said field of said digital video signal is indicated by a field number.

19. A signal reproduction method according to claim 17, wherein said frame of said digital video signal is indicated by a frame number.

20. A signal reproduction device according to claim 10, wherein said field of said digital video signal is indicated by a field number.

21. A signal reproduction device according to claim 1, wherein said write control means includes means for judging whether said digital video signals of the prescribed unit length included in said digital video signals stored in said first memory means have the same field as said identified field when digital video signals of a predetermined length of said reproduced digital video signals have a same field which is different from said identified field.

22. A signal reproduction method according to claim 8, wherein said field of said digital video signal is indicated by a field number.

23. A signal reproduction method according to claim 8, wherein said judging step includes a step of judging whether said digital video signals of the prescribed unit length included in said digital video signals stored in said first memory means have the same field as said identified field when digital video signals of a predetermined length of said reproduced digital video signals have a same field which is different from said identified field.

* * * * *